United States Patent [19]

Williams et al.

[11] Patent Number: 4,458,804

[45] Date of Patent: Jul. 10, 1984

[54] CONTOUR IN-FEED MEANS FOR CONTINUOUS MOTION CAN DECORATOR

[75] Inventors: Robert Williams, Randolph; Albin Rohr, Rockaway, both of N.J.

[73] Assignee: Sun Chemical Corporation, New York, N.Y.

[21] Appl. No.: 64,491

[22] Filed: Aug. 7, 1979

Related U.S. Application Data

[63] Continuation-in-part of Ser. No. 823,980, Aug. 12, 1977, abandoned.

[51] Int. Cl.$^3$ .......... B65G 47/84

[52] U.S. Cl. .......... 198/480

[58] Field of Search .......... 198/480–482, 198/540, 562, 608, 611, 612, 689, 803, 836; 101/40; 118/230, 319

[56] References Cited

U.S. PATENT DOCUMENTS

| | | | |
|---|---|---|---|
| 1,397,990 | 11/1921 | Thompson | 198/481 |
| 2,339,008 | 1/1944 | Gladfelter et al. | 118/319 |
| 2,874,701 | 2/1959 | Stelzer | 198/481 |
| 2,919,801 | 1/1960 | Pechy | 198/608 |
| 3,503,488 | 3/1970 | Stone | 198/481 |
| 3,722,663 | 3/1973 | Nalbach | 198/836 |
| 3,944,048 | 3/1976 | Grishaev et al. | 198/482 |
| 4,140,053 | 2/1979 | Skrypek et al. | 101/40 |

*Primary Examiner*—Joseph E. Valenza

*Attorney, Agent, or Firm*—Cynthia Berlow

[57] ABSTRACT

A continuous motion can decorator is provided with a power driven means that moves undecorated cans through a feed chute. A pocket wheel, for loading of cans onto mandrels, receives cans directly from the chute. Adjacent pockets of the pocket wheel are connected by a lead-in surface that is tangent to the downstream pocket at a point radially outward of the tangent between the lead-in surface and the upstream pocket. The lead-in surface is of essentially constant radius. A can when initially fully seated in a pocket is engaged by a can in the chute which is positioned so that the center thereof is essentially on a line extending through the center of the fully seated can and the center about which the lead-in surface is formed.

14 Claims, 9 Drawing Figures

CONTOUR IN-FEED MEANS FOR CONTINUOUS MOTION CAN DECORATOR

This application is a continuation-in-part of our co-pending U.S. patent application Ser. No. 823,980 filed Aug. 12, 1977 now abandoned.

This invention relates to feeding apparatus for delivering cans to a pocket wheel rotating at high speed.

Continuous motion high speed can decorating apparatus of the type illustrated in U.S. Pat. Nos. 3,563,170, 3,766,851, and 3,976,187 utilize freely rotatable mandrels to carry cans while decorations are applied to the latter. The cans are loaded on the mandrels from a continuously rotating wheel having curved seats or pockets along the periphery thereof to receive undecorated cans from a supply source. Typically, there is a feed screw and star wheel combination interposed between the supply source and the pocket wheel to space the undecorated cans by the distance between pockets in the pocket wheel.

At high speeds, say in excess of 800 cans per minute, the likelihood of cans being damaged by the feed screw or being jammed thereat increases. Thus, the prior art has attempted to utilize a gravity feed chute to feed cans directly into pockets of the pocket wheel. While a measure of success in this direction has been achieved by others, as exemplified by the construction disclosed in U.S. Pat. No. 4,138,941 issued Feb. 13, 1979, to D. L. McMillan et al. for a Continuous Gravity Fed Printer and Transfer Apparatus, at extremely high speeds, can flow in the gravity feed chute becomes irregular, causing the cans to bounce against one another. This bouncing often causes direct damage to the cans and in other instances interferes with loading into the pockets of the pocket wheel so tha an out-of-sync condition exists whereby the pocket wheel damages the cans.

In order to eliminate the prior art difficulties of gravity feed chutes delivering cans directly to a pocket wheel, the instant invention provides a pocket wheel constructed to cooperate with the feed chute so that within the chute there is continuous flow at uniform speed rather than the stop-go, vibrating and/or non-uniform rate of flow typical of prior art constructions. The instant invention achieves uniform flow by connecting adjacent pockets of the pocket wheel by a lead-in surface that is tangent to both of these pockets and is an arc segment of uniform radius. In addition, the feed chute is constructed and positioned so that at the moment a can is initially seated in a pocket the center of the can adjacent thereto and in the chute is located on a line extending from the center about which the lead-in arc is drawn through the center of the pocket that has just been loaded.

Since the common aluminum cans for soda and beer are so light, when gravity feed is used, as machine speed increases, movement of cans within the chute becomes unreliable and at extremely high speeds becomes inadequate to meet demands of the pocket wheel. Thus, the instant invention also applies a downstream directed force to a substantial number of cans at the downstream end of the feed chute. This downstream force is applied continuously by a friction feed belt.

Accordingly, a primary object of the instant invention is to provide improved high speed contour feed means for loading undecorated cans in the pockets of a continuously rotating pocket wheel.

Another object is to provide contour feed means of this type which achieves improved operation at extremely high speeds.

Still another object is to provide a contour feed means of this type in which cans in the feed chute advance continuously at uniform speed.

Yet another object is to provide a contour feed means of this type in which a mechanically driven means applies a downstream directed force to those cans at the downstream end of the feed chute.

A further object is to provide contour feed means of this type in which adjacent pockets of the pocket wheel are connected by lead-in surfaces each of which is an arc of uniform radius.

A still further object is to provide contour feed means of this type in which a can initially seated in a pocket is tangent to a can in the chute upstream thereof at the point of tangency between the lead-in surface and the newly loaded pocket.

These objects as well as other objects of this invention shall become readily apparent after reading the following description of the accompanying drawings in which.

Figure 2:
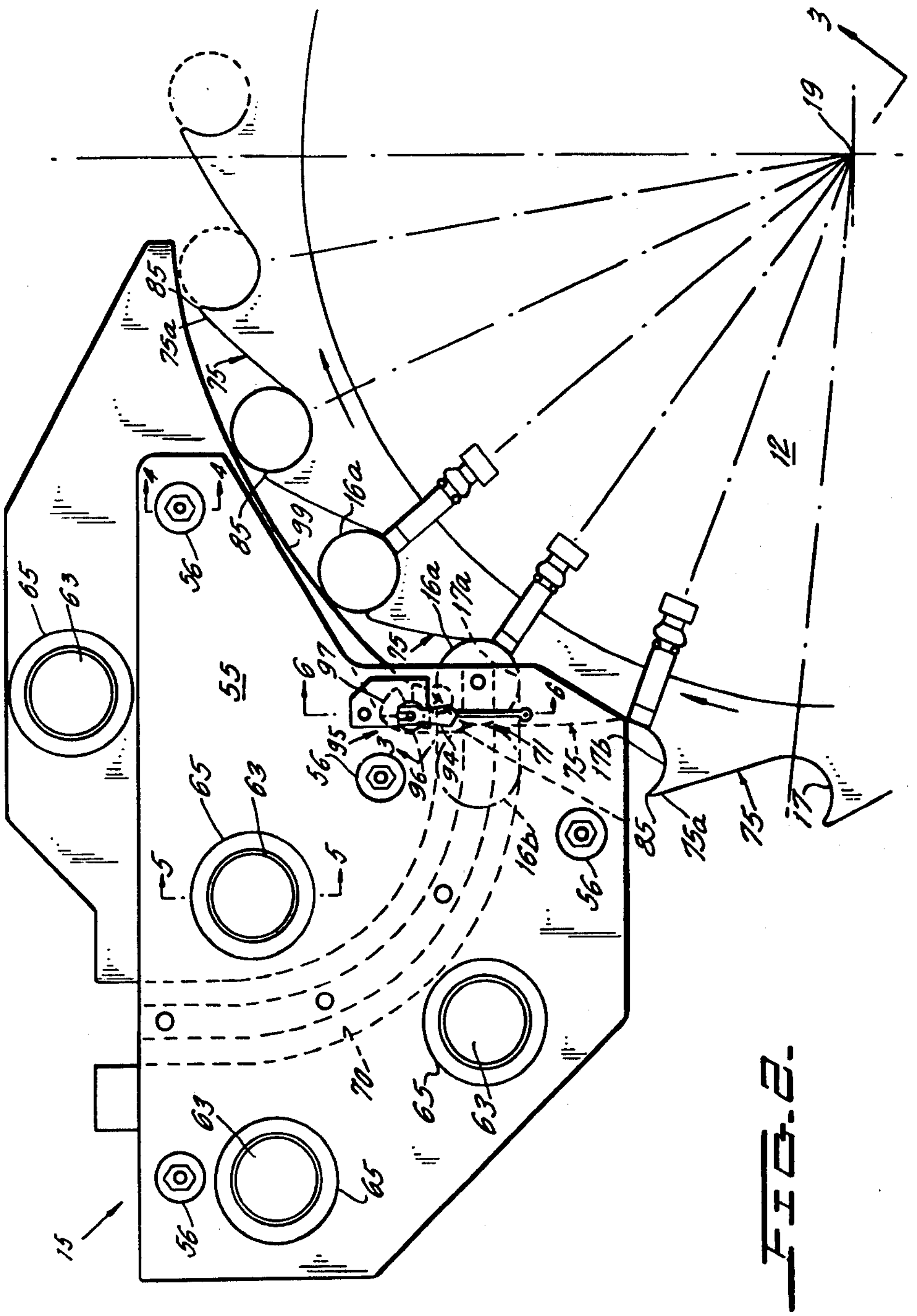
FIG. 2 is an enlarged fragmentary portion of FIG. 1 in the region of the contour feed means.

FIGS. 3, 4, 5 and 6 are cross-sections taken through the respective arrows 3—3, 4—4, 5—5 and 6—6 of FIG. 2 looking in the directions of the respective arrows, 3—3, 4—4, 5—5 and 6—6.

Figure 7:
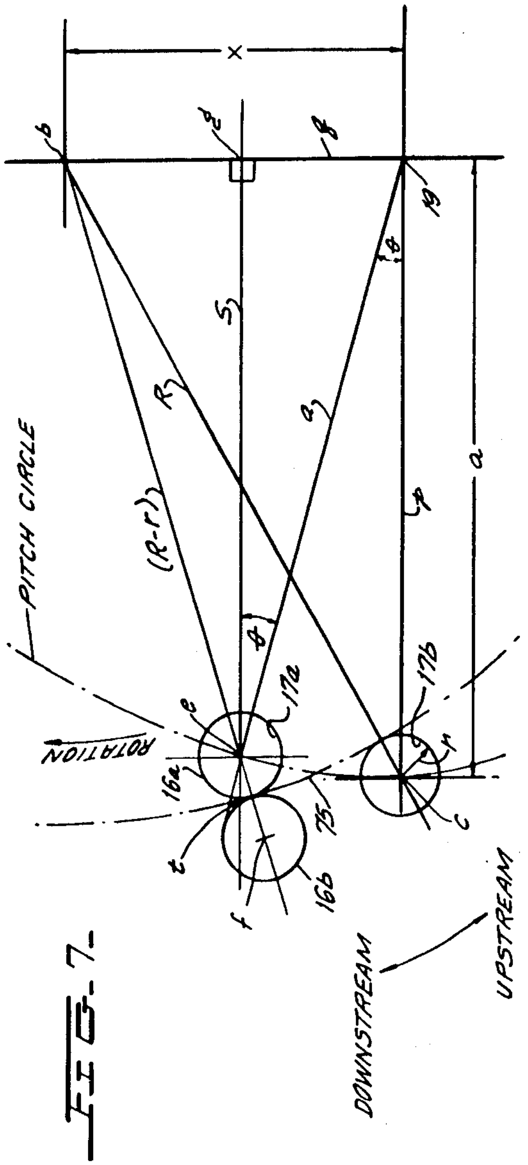
Figure 5:
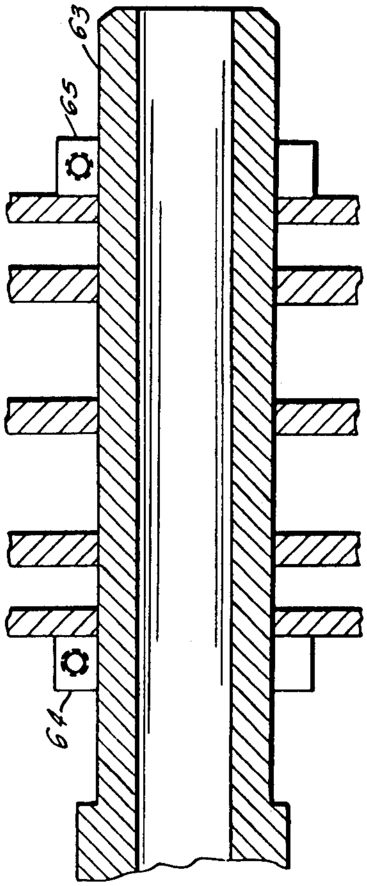
Figure 6:
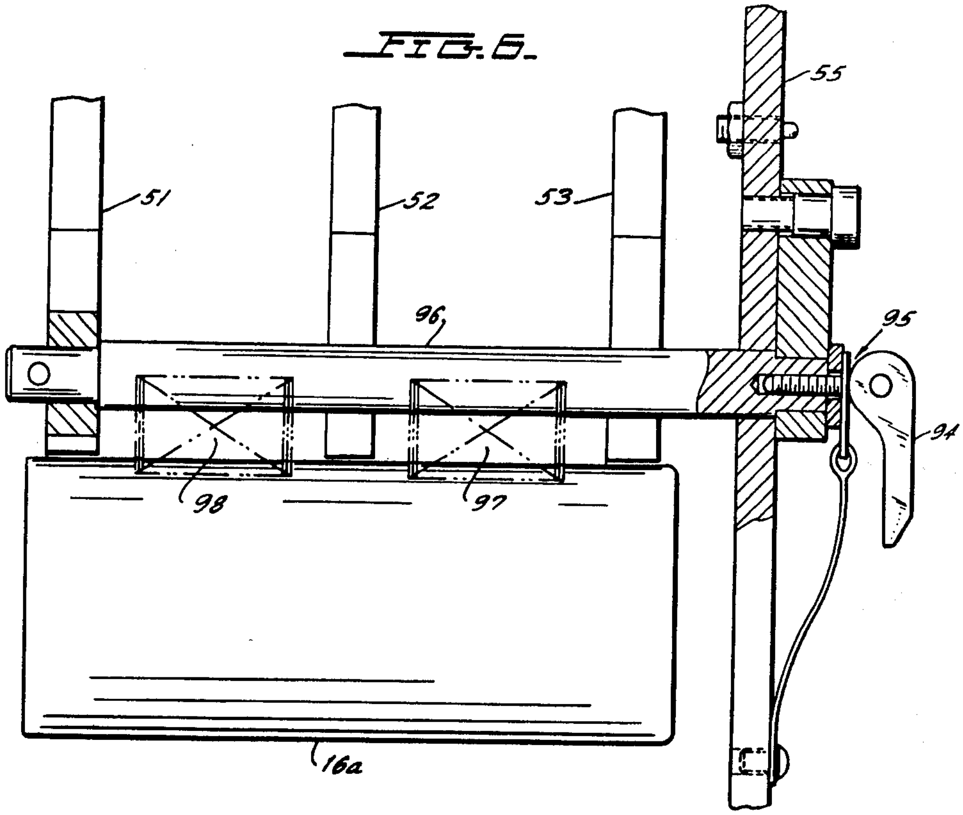

FIG. 7 is a diagram illustrating an idealized form embodying salient features of the instant invention.

Figure 1:
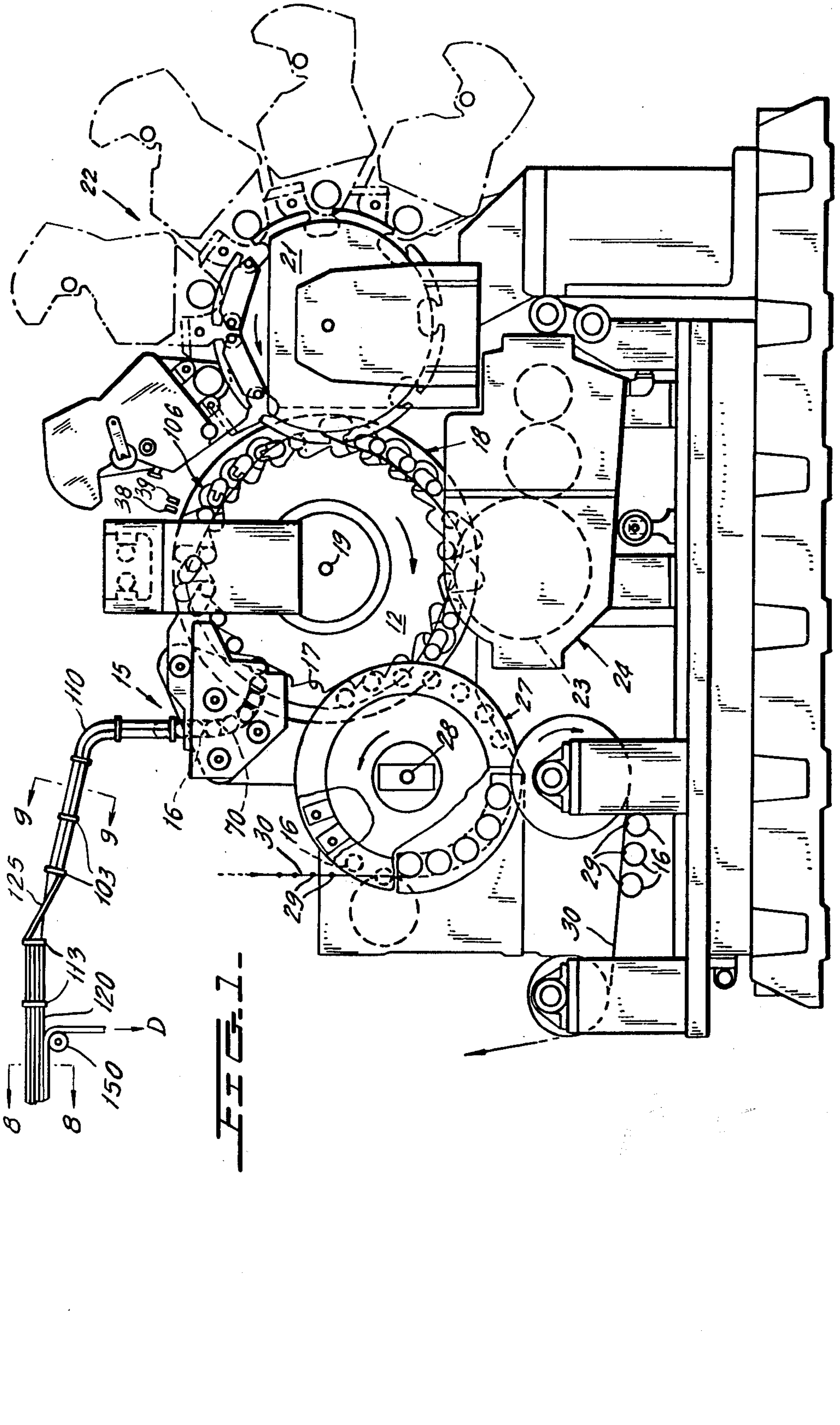
FIG. 1 is a front elevation of continuous motion can decorating apparatus including contour feed means contructed in accordance with teachings of the instant invention.
Figure 8:
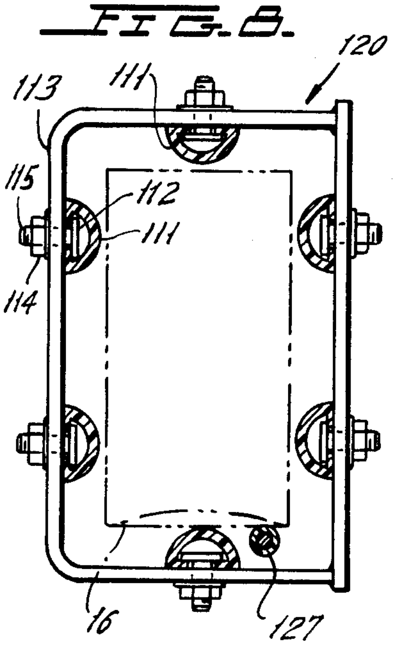
Figure 9:
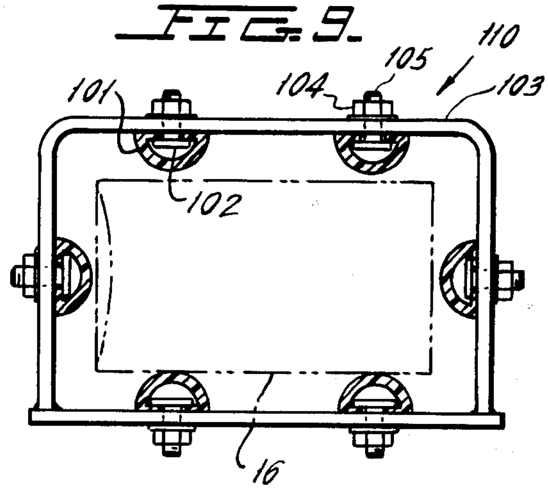

FIGS. 8 and 9 are cross-sections of the infeed chute taken through the respective lines 8—8 and 9—9 of FIG. 1 looking in the directions of the respective arrows 8—8 and 9—9.

Now referring to the Figures and more particularly to FIG. 1 which illustrates continuing motion cylindrical container decorating apparatus of the general type described in U.S. Pat. No. 4,140,053, issued Feb. 20, 1979, to J. P. Skrypek et al. for a Mandrel Mounting and Trip Mechanism For Continuous Motion Decorator. Briefly, the apparatus of FIG. 1 includes infeed conveyor 15 which receives cans 16, open at one end thereof, from a supply (not shown) and places them in arcuate cradles or pockets 17 along the periphery of spaced rings 13, 14 (FIG. 3) forming the peripheral portion of pocket wheel 12. The latter is fixedly secured to carrier wheel 18 which in turn is keyed to continuously rotated horizontal drive shaft 19. Horizontal spindles or mandrels 20 (FIG. 3) are also mounted to wheel 18, with each spindle 20 being in spaced horizontal alignment with an individual pocket 17 in a short region extending downstream from infeed conveyor 15. Undecorated cans 16 are transferred from each cradle 17 to a mandrel 20 by an individual spring arm 42 mounted on slide 43 which is driven horizontally through the action of stationary cam 44 and followers 45, 46 secured to slide 43. Suction applied through an axial passage extending to the end of mandrel 20 which receives container 16 draws the latter to final seating position on mandrel 20.

While mounted on mandrels 20, cans 16 are decorated by being brought into engagement with continuously rotating image transfer mat or blanket 21 of the multicolor printing press indicated generally by reference numeral 22. Thereafter, and while still mounted on mandrels 20, each decorated can 16 has a protective film of varnish applied thereto by engagement with the periphery of applicator roll 23 in the overvarnish unit indicated generally by reference numeral 24. Cans 16 with decorations and protective coating thereon are then transferred from mandrels 20 to suction cups (not shown) mounted along the periphery of transfer wheel 27. The latter rotates continuously about shaft 28 in the center. Cans 16 carried by transfer wheel 27 are deposited on generally horizontal pins 29 carried by chain-type output conveyor 30 which carries cans 16 through a curing oven (not shown).

Each mandrel 20 is loaded with a can 16 by the time mandrel 20 is in the proximity of sensors 63, 64 which detect whether the particular mandrel 20 contains a properly mounted can 16. If sensors 38, 39 detect that a mandrel 20 is unloaded or is not properly loaded, as this mandrel 20 passes through the decorating zone wherein printing blanket 21 normally engages cans 16 on mandrels 20, as explained in the aforesaid U.S. Pat. No. 4,140,053, this misloaded mandrel 20 is moved to a "no-print" position wherein as this mandrel 20 moves through the decorating zone it will be spaced from the periphery of blanket 21.

Figures 3, 4:
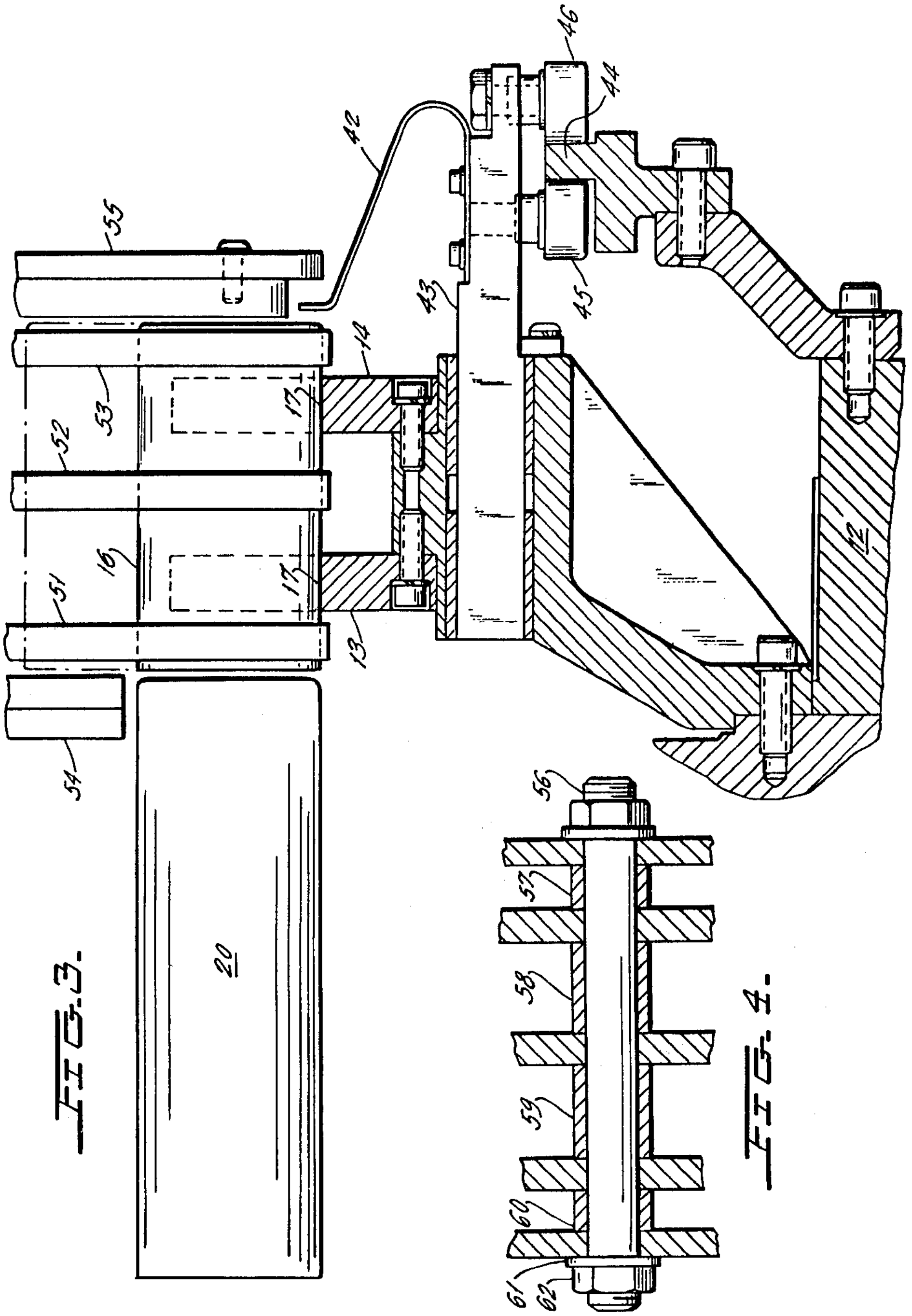

The downstream end of infeed conveyor 15 is constructed of interior plates 51, 52 and 53 and outer plates 54, 55 maintained in spaced parallel relationship by four assemblies each of which consists of stud 56, spacer sleeves 57, 58, 59, 60, lock washer 61 and nut 62 (FIG. 4). Four posts extend horizontally from the machine frame and are received by aligned apertures in plates 51–55 to operatively position conveyor 15. Collars 64, 65 operatively position and lock conveyor 15 on pins 63.

Inner plates 51, 52, 53 are provided with horizontally aligned curved slots which cooperate to form feed chute section 70 through which cans **16*a*, 16*b*, etc. flow into pockets 17 of pocket wheel 12. As cans 16*a*, 16*b*, etc. flow through chute 70, the axes of cans 16*a*, 16*b*, etc. are horizontal and perpendicular to the flow direction. At loading region 71 where the outfeed or lower end of chute 70 meets pocket wheel 12, ring 13 runs through the space between plates 51, 52 and ring 14 runs through the space between plates 52, 53** (FIG. 3).

Downstream of loading region 71 inner plates 51–53 provide arcuate retaining surface 99 which is slightly outboard of cans 16 being carried upward by pocket wheel 12. The spacing between the upstream end of surface 99 and can **16*a* which has just left chute 70 is substantially greater than spacing between surface 99 and cans downstream of can 16*a*. This increased spacing is provided to prevent damage to can 16*a* as its direction of motion changes abruptly at loading region 71 at which time there may be a tendency for can 16*a* to jump upward which is not under control. To damp this jump-like motion of can 16*a*, readily yieldable resilient means, constituted by brush sections 97, 98 (FIG. 6), is provided as an abutment to maintain can 16*a* seated on pocket wheel 12 at loading region 71**.

The bristles of both brush sections 97, 98 are arranged in a triangular configuration radiating from rod 96. The latter is pivotally mounted to plates 51 and 55 and is held in a selected angular position by locking device 95 having manual operating handle 94.

In FIG. 2 pocket wheel 12 is shown in its angular position wherein can **16*a* has just been fully seated in pocket 17*a*. Ideally lead-in surface 75 between pocket 17*a* and adjacent upstream pocket 17*b* is a circular arc tangent to both pockets 17*a* and 17*b*. Further, the centers of cans 16*a*, 16*b* are connected by a line which extends through the center about which lead-in surface 75** is formed.

It has been found that for practical devices the center about which lead-in arc 75 is formed is located on one or the other of two quadrature lines described with reference to FIG. 7 in which point b is the center about which lead-in surface 75 is formed. Point b is located on quadrature line q extending through the rotational axis 19 of pocket wheel 12. Line q is also perpendicular to the other quadrature line extending through center 19 and the center c about which the arc segment forming upstream pocket **17*b* is formed. The centers of all pockets 17** are uniformly space along a circle of pitch radius a so that the angular spacing $\theta$ between adjacent pockets 360° divided by the number of pockets. Line s is parallel to line p so that the former is perpendicular to line q.

Thus, the right triangle c, b, 19 is represented by the equation:

$$X^2+a^2=(R+r)^2$$

where R = the radius of the lead-in surface arc and r = the radius of the pocket arcs.

Further, e is the center of pocket **17*a*** so that right triangle e, b, g is represented by the equation:

$$(X-a\sin\theta)^2+(a\cos\theta)^2=(R-r)^2.$$

In a practical construction, wheel 12 has 24 equally spaced pockets 17 on a pitch radius of 20 inches. The pocket diameter is essentially equal to the can diameter of 2.6". This results in the positioning of center b, about which the lead-in arc defining surface 75 in FIG. 7 is formed, on quadrature line q at a distance X = 10.753" from rotational axis 19 of pocket wheel 12, with the radius of surface 75 being 21.407 inches.

At the instant can **16*a* becomes fully seated in pocket 17*a*, can 16*b* in chute 70 upstream of can 16*a* engages the latter at point t where the arc of lead-in surface 75 is tangent to the arc of pocket 17*a*. At this instant, center f of can 16*b*** is on a line extending through points b, e and t.

With reference to FIG. 2 it is seen that the extreme downstream end 85 of lead-in surface 75 is connected with the pocket arc 17 by a curve of small radius rather than by a sharp tip section. This assures smooth engagement between a can, such as can **16*b*, leaving chute 70 and engaging lead-in surface 75. Short portion 75*a* at the downstream end of lead-in surface 75 is slightly undercut to provide clearance as lead-in surface 75 initially contacts can 16*b* so as to reduce the likelihood that can 16*b* will, even momentarily, be pushed away from pocket wheel 12. As is well known to the art, the radius of downstream end 85 as well as the extent and shape of undercut portion 75*a*** are primarily functions of can diameter and top can feed rate.

A contour chute constructed and positioned in accordance with teachings of the instant invention to feed cans directly to a pocket wheel constructed in accordance with the instant invention enables feeding to occur at speeds substantially in excess of 1,000 cans per minute. Because there is essentially continuous can flow at uniform speed within the chute the likelihood of jams and/or can damage is substantially reduced as compared to gravity or other types of prior art feeders.

With particular reference to FIGS. 1, 8 and 9 it is seen that upstream of chute portion 70 defined by plates 51–54, chute portion 110 of infeed 15 is defined by six half round hollow relatively low friction plastic guide strips 101 each having a metal stiffening strip 102 extending therethrough. Guide strips 101 extend through and are secured to a plurality of rectangular frames 103 spaced along the length of the chute portion 110 and secured to a rigid framework (not shown). A nut 104 and screw 105 secure the individual guide strips 101 to each frame 103.

In chute portion 110, as in chute portion 70, cans 16 are oriented with their cylindrical axes horizontal. However, further upstream, at chute portion 120 the cylindrical axes of cans 16 are generally vertical. As seen in FIG. 8, chute portion 120 is also constructed of six half round hollow low friction plastic guide strips 111 each having a metal stiffening strip 112 extending therethrough. Guide strips 111 extend through rectangular frames 113 (only one of which is shown) and are secured thereto by screws 114 threadably engaged by nuts 115.

The downstream end of chute section 120 is connected to the upstream end of chute section 110 by transition chute section 125 which is constructed, in a manner well known to the art, to pivot the axis of each can 16 from a generally vertical position as it leaves chute section 120 to a horizontal position as it enters chute section 110. Extending a substantial portion of the length of chute section 120 is the upper flight of closed loop belt 127 which is continuously driven in the direction indicated by arrow D in FIG. 1. Belt 127 has a stranded metal interior covered by a plastic coating which is in a frictional driving engagement with the bottom of cans 16 to positively move them downstream.

Pulley 150 drives belt 127 at a speed greater than that required to move cans 16 through conveyor 15 at the rate cans 16 are demanded by pocket wheel 12. This overspeed results in slippage between belt 127 and some of the cans 16 in chute section 120. However, this overspeed assures that belt 127 will always apply a positive mechanical force in a downstream direction against those cans 16 in the portions of chute 15 downstream of friction drive belt 127. This positive downstream force results in improved can loading at extremely high peripheral speeds for pocket wheel 12 in that it assures that the rate of can movement through the downstream end of chute 15 will be sufficiently great to make a can 16*a* available for loading in each of the pockets 17 of wheel 12. The speed of drive pulley 150 may be coordinated with that of wheel 12 either by setting the latter to operate at a speed great enough to deliver a sufficient number of cans 16 to wheel 12 even when the latter is operating at top speed or by having an electrical or mechanical coupling which operates so that pulley 150 and wheel 12 automatically speed up and slow down together.

It should now be understood by those skilled in the art that the foregoing dimensional relationships are idealized conditions. However, for some applications tolerable results may be obtained by deviating by as much as 5 to 10% from the idealized dimensional relationships.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. Container infeed apparatus including a continuously rotated carrier wheel having a plurality of pockets equally spaced along the periphery thereof, said pockets being positioned and contoured to receive cylindrical articles having their axes parallel to the rotational axis of said wheel, a feed chute through which cylindrical articles move in adjacent side-by-side relationship with their axes perpendicular to the direction of movement through said chute, said chute guiding these articles from a supply source to a loading region where these articles are delivered directly to said pockets while said wheel rotates, each of said pockets having a profile that is a segment of a circular pocket arc of a radius substantially equal to the radius of those containers in the chute, each of said pockets and the pocket adjacent thereto and downstream thereof being connected by a lead-in surface the major portion of which is defined by a segment of a circular lead-in arc, said pocket arcs having centers located on a pitch circle having said rotational axis as a center, each of said lead-in arcs having the downstream end thereof tangent to said pocket arcs at a point outboard of said pitch circle and having the upstream end thereof tangent to the next upstream one of said pocket arcs at a point inboard of said pitch circle, and said chute being constructed and operatively positioned so that at the loading region a cylindrical article upon initial full seating in a pocket is engaged by an adjacent upstream article in said chute at the tangent point between the pocket arc at the loading region and the lead-in arc extending upstream therefrom.

2. Container infeed apparatus as set forth in claim 1 in which the feed chute is elongated; power driven means for applying a downstream directed force directly to cylindrical articles in said feed chute at a location substantially upstream of said loading region; said downstream directed force being transmitted through cylindrical articles downstream of those cylindrical articles to which the force is directly applied whereby the force continuously urges the most downstream cylindrical article at the loading region through the downstream end of the feed chute.

3. Container infeed apparatus as set forth in claim 1 in which each of the lead-in arcs is formed about a center disposed on one of two lines perpendicular to each other and extending through the rotational axis, with one of the lines extending through the center of the pocket arc at the upstream end of this lead-in arc.

4. Container infeed apparatus as set forth in claim 1 in which the lead-in surface at its downstream end is joined to said pocket by a rounded section of relatively small radius.

5. Container infeed apparatus as set forth in claim 4 in which a portion of the lead-in surface immediately upstream of the rounded sections is slightly undercut with respect to the lead-in arc.

6. Container infeed apparatus as set forth in claim 1 in which each of the lead-in arcs is formed about a center disposed on a line extending approximately through said rotational axis and being approximately perpendicular to a line extending through said rotational axis and the center of the pocket arc at the upstream end of this lead-in arc.

7. Container infeed apparatus as set forth in claim 6 where the center of the lead-in arc is located a distance X from the rotational axis determined by solving the equations:

$$X^2+a^2=(R+r)^2 \text{ and}$$

$$(X-a \sin \theta)^2+(a \cos \theta)^2=(R-r)^2,$$

Where:

a = radius of pitch circle
R = radius of lead-in arc
r = radius of pocket arc
$\theta$ = 360° ÷ number of pockets.

8. Container infeed apparatus as set forth in claim 7 in which the lead-in surface at its downstream end is joined to said pocket by a rounded section of relatively small radius.

9. Container infeed apparatus as set forth in claim 8 in which a portion of the lead-in surface is rounded and the portion immediately upstream thereof is slightly undercut with respect to the lead-in arc.

10. Container infeed apparatus as set forth in claim 1 in which each of the lead-in arcs is formed about a different center each of which is displaced from the axis of rotation.

11. Container infeed apparatus as set forth in claim 3 in which the center of each of the lead-in arcs is on said one of the lines.

12. Container infeed apparatus as set forth in claim 1 also including a yieldable resilient abutment means operatively positioned at the loading region to block movement of cylindrical articles out of said pockets.

13. Container infeed apparatus as set forth in claim 12 in which there is a brush-like device constituting the yieldable resilient abutment means.

14. Container infeed apparatus as set forth in claim 1 in which the carrier wheel and feed chute are operatively positioned so that a cylindrical article upon being fed from the chute and upon initial full seating in a pocket is immediately thereafter carried upward by said wheel.

* * * * *